United States Patent
Hu

(10) Patent No.: US 8,401,288 B2
(45) Date of Patent: Mar. 19, 2013

(54) METHOD, APPARATUS, AND SYSTEM FOR IMPROVED COLOR STATISTIC PRUNING FOR AUTOMATIC COLOR BALANCE

(75) Inventor: Shane C. Hu, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 1246 days.

(21) Appl. No.: 11/513,247

(22) Filed: Aug. 31, 2006

(65) Prior Publication Data

US 2007/0133870 A1 Jun. 14, 2007

Related U.S. Application Data

(63) Continuation-in-part of application No. 11/302,126, filed on Dec. 14, 2005.

(51) Int. Cl.
*G06K 9/00* (2006.01)
(52) U.S. Cl. ........................................ 382/167
(58) Field of Classification Search ........................ None
See application file for complete search history.

(56) References Cited

U.S. PATENT DOCUMENTS

| | | | |
|---|---|---|---|
| 4,602,277 A * | 7/1986 | Guichard | 348/228.1 |
| 5,115,327 A * | 5/1992 | Ishima | 358/461 |
| 5,274,439 A | 12/1993 | Dischert et al. | |
| 5,489,939 A | 2/1996 | Haruki et al. | |
| 5,907,629 A * | 5/1999 | Funt et al. | 382/162 |
| 6,140,630 A | 10/2000 | Rhodes | |
| 6,192,152 B1 * | 2/2001 | Funada et al. | 382/199 |
| 6,204,524 B1 | 3/2001 | Rhodes | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 6,628,830 B1 * | 9/2003 | Yamazoe et al. | 382/168 |
| 6,681,042 B1 * | 1/2004 | Weldy | 382/167 |
| 6,754,381 B2 * | 6/2004 | Kuwata | 382/162 |
| 6,774,938 B1 * | 8/2004 | Noguchi | 348/225.1 |
| 6,850,272 B1 | 2/2005 | Terashita | |
| 6,853,748 B2 * | 2/2005 | Endo et al. | 382/167 |
| 6,906,744 B1 | 6/2005 | Hoshuyama et al. | |
| 6,937,774 B1 * | 8/2005 | Specht et al. | 382/254 |
| 7,110,598 B2 * | 9/2006 | Hu | 382/167 |
| 7,162,078 B2 * | 1/2007 | Cheng | 382/167 |
| 7,173,663 B2 * | 2/2007 | Skow et al. | 348/364 |
| 7,227,586 B2 * | 6/2007 | Finlayson et al. | 348/655 |
| 7,283,667 B2 * | 10/2007 | Takeshita | 382/168 |

(Continued)

FOREIGN PATENT DOCUMENTS

| | | |
|---|---|---|
| JP | 60-500116 A | 1/1985 |
| JP | 11-331738 A | 11/1999 |

(Continued)

OTHER PUBLICATIONS

R.W. Hunt, "The Reproduction of Colour," 4th Ed. 1987, Section 16.7, pp. 294-296, Fountain Press, ISBN 0-86343-088-0, Tolworth, England.

(Continued)

*Primary Examiner* — Samir Ahmed
(74) *Attorney, Agent, or Firm* — Dickstein Shapiro LLP

(57) ABSTRACT

Pixels from an image are sampled for gray world statistics. To avoid the effect of saturated regions, the color pixels are pruned based on predetermined criteria for individual and combined color channel values. If a predetermined percentage of the pixels are included in the gray world statistics, color channel gain is calculated and applied to the image for color balancing.

28 Claims, 7 Drawing Sheets

U.S. PATENT DOCUMENTS

| | | | |
|---|---|---|---|
| 7,319,483 B2 * | 1/2008 | Park et al. | 348/223.1 |
| 7,319,544 B2 * | 1/2008 | Sharman | 358/1.9 |
| 7,336,308 B2 | 2/2008 | Kubo | |
| 7,423,779 B2 * | 9/2008 | Shi | 358/1.9 |
| 7,447,374 B1 * | 11/2008 | Reid | 382/254 |
| 7,480,421 B2 * | 1/2009 | Henley | 382/274 |
| 7,515,181 B2 * | 4/2009 | Terashita | 348/231.6 |
| 7,961,227 B2 | 6/2011 | Arakawa | |
| 2003/0063197 A1 * | 4/2003 | Sugiki | 348/223.1 |
| 2003/0151758 A1 | 8/2003 | Takeshita | |
| 2004/0119854 A1 * | 6/2004 | Funakoshi et al. | 348/242 |
| 2004/0120575 A1 | 6/2004 | Cheng | |
| 2004/0202365 A1 | 10/2004 | Spaulding et al. | |
| 2005/0068330 A1 | 3/2005 | Speigle et al. | |
| 2005/0069200 A1 | 3/2005 | Speigle et al. | |
| 2005/0069201 A1 | 3/2005 | Speigle et al. | |
| 2005/0122408 A1 | 6/2005 | Park et al. | |
| 2005/0219379 A1 | 10/2005 | Shi | |

FOREIGN PATENT DOCUMENTS

| | | |
|---|---|---|
| JP | 2003-87818 A | 3/2003 |
| JP | 2004-328564 A | 11/2004 |
| JP | 2005-109705 A | 4/2005 |
| JP | 2005-167956 A | 6/2005 |

OTHER PUBLICATIONS

Wyszecki & Stiles, "Color Science, Concepts and Method, Quantitative Data and Formulae," 2nd Ed. 2000, Sections 3.2-3.3, pp. 117-175, John Wiley & Sons, Inc., ISBN 0-471-39918-3, New York, New York.

* cited by examiner

METHOD, APPARATUS, AND SYSTEM FOR IMPROVED COLOR STATISTIC PRUNING FOR AUTOMATIC COLOR BALANCE

CROSS REFERENCE TO RELATED APPLICATIONS

This application is a continuation in part of and claims priority to U.S. application Ser. No. 11/302,126, filed Dec. 14, 2005, the disclosure of which is incorporated by reference in its entirety.

BACKGROUND

Various embodiments relate to imaging methods, devices, and systems and more particularly to automatic color balancing techniques for imaging methods, devices, and systems.

Solid state imagers, including charge coupled devices (CCD), CMOS imagers and others, have been used in photo imaging applications. A solid state imager circuit includes a focal plane array of pixel cells, each one of the cells including a photosensor, which may be a photogate, photoconductor or a photodiode having a doped region for accumulating photo-generated charge. Each pixel cell has a charge storage region, formed on or in the substrate, which is connected to the gate of an output transistor that is part of a readout circuit. The charge storage region may be constructed as a floating diffusion region. In some imager circuits, each pixel cell may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the necessary functions of: (1) photon to charge conversion; (2) accumulation of image charge; (3) resetting the storage region to a known state; (4) transfer of charge to the storage region; (5) selection of a pixel cell for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524 and U.S. Pat. No. 6,333,205, assigned to Micron Technology, Inc., which are hereby incorporated by reference in their entirety.

Color constancy is one of the characteristics of the human vision system. The human vision system is very capable of discriminating color objects under different lighting conditions. The color of an object looks substantially the same under vastly different types of natural and artificial light sources, such as sun light, moon light, incandescent, fluorescent, and candle light. However, due to the change in the spectral power distribution of the illumination, the perceived lightness and color appearance of the scene will change. The human vision system does not remove the influence of the light source completely.

A possible explanation is that the human vision system does not function as an absolute colorimetric device. The perceived images contain interactions of light sources and object reflectance. Therefore, for a captured image from an imaging device to look natural, the influence of the light source must be preserved in a manner similar to the way the human vision system functions. For example, the reproduced sunset scene must look like a sunset scene. This hypothesis is supported by R. W. G. Hunt's observation that a more pleasing effect is often produced in color prints if they are so made that instead of the color balance being correct, in which gray is printed as gray, it is so adjusted that the whole picture integrates to gray. R. W. G. Hunt, "The Reproduction of Colour" §16.7. The gray world theory assumes that all of the colors in a picture should integrate (i.e. average) to gray. Accordingly, there is a need and desire for an imaging device that more accurately color balances a captured image.

DETAILED DESCRIPTION

A color balancing method and apparatus are provided by which an image's color balance under different illuminations can be more closely maintained. According to an embodiment described herein, pixels from an input image having an imager color space, for example, a red-green-blue (RGB) color space, are sampled for gray world statistics. To avoid the effect of saturated regions, the pixels are pruned. Gain is then computed for each RGB channel with respect to a neutral white point. The channel gains are applied to the RGB image. This process creates a transformed color balanced image suitable for display. The various embodiments may be implemented to operate on analog or digital image data and may be executed in hardware, software, or a combination of the two.

In the following description of the various embodiments, an imager color space will be described as an RGB color space for example purposes only; however, other color imaging protocols could be used, including, for example, a subtractive CMYK (cyan, magenta, yellow, black) color space or another color space.

Figure 1:
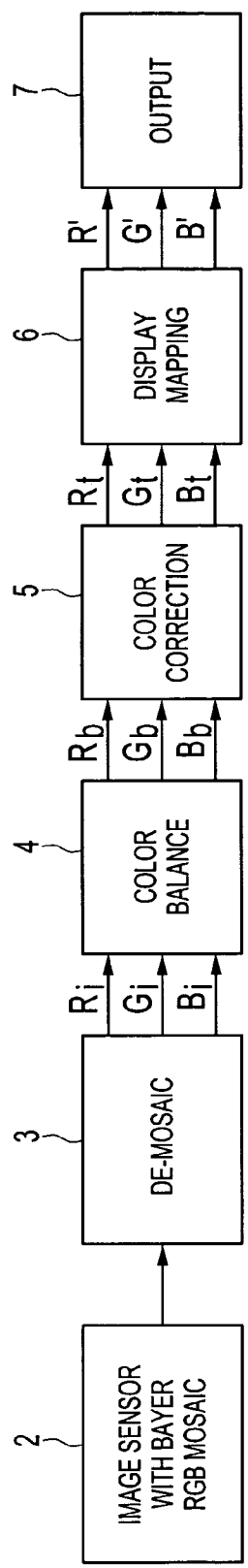
FIG. 1 shows a functional block diagram illustrating a color balancing process according to an embodiment.

The general processing flow of an embodiment is now explained with reference to the figures. Referring to FIG. 1, image sensor data from an RGB color space is acquired from an image sensor 2 using a tiled color filter array, such as a Bayer filter pattern. A de-mosaic process 3, interpolating the tiled Bayer-RBG signal, is applied to produce Ri, Gi, and Bi signals. The Ri, Gi, and Bi, signals are color balanced in color balance process 4 to produce Rb, Gb, and Bb signals by gathering chromaticity statistics of the image and calculating channel gains as explained below in more detail with reference to FIGS. 3 and 4. The Rb, Gb, and Bb signals are then subjected to a color correction process 5 to produce Rt, Gt, and Bt signals by applying a conventional or any other color correction scheme. Display mapping 6 is applied to the color corrected signals Rt, Gt, and Bt signals to produce R', G', and B' signals suitable for displaying or otherwise outputting of the RGB image at output process 7. It should be appreciated that any known color pattern mosaic, de-mosaic, color correction, display mapping, and display techniques may be respectively used in illustrated processing blocks 2, 3, 5, 6, and 7.

Figure 2:
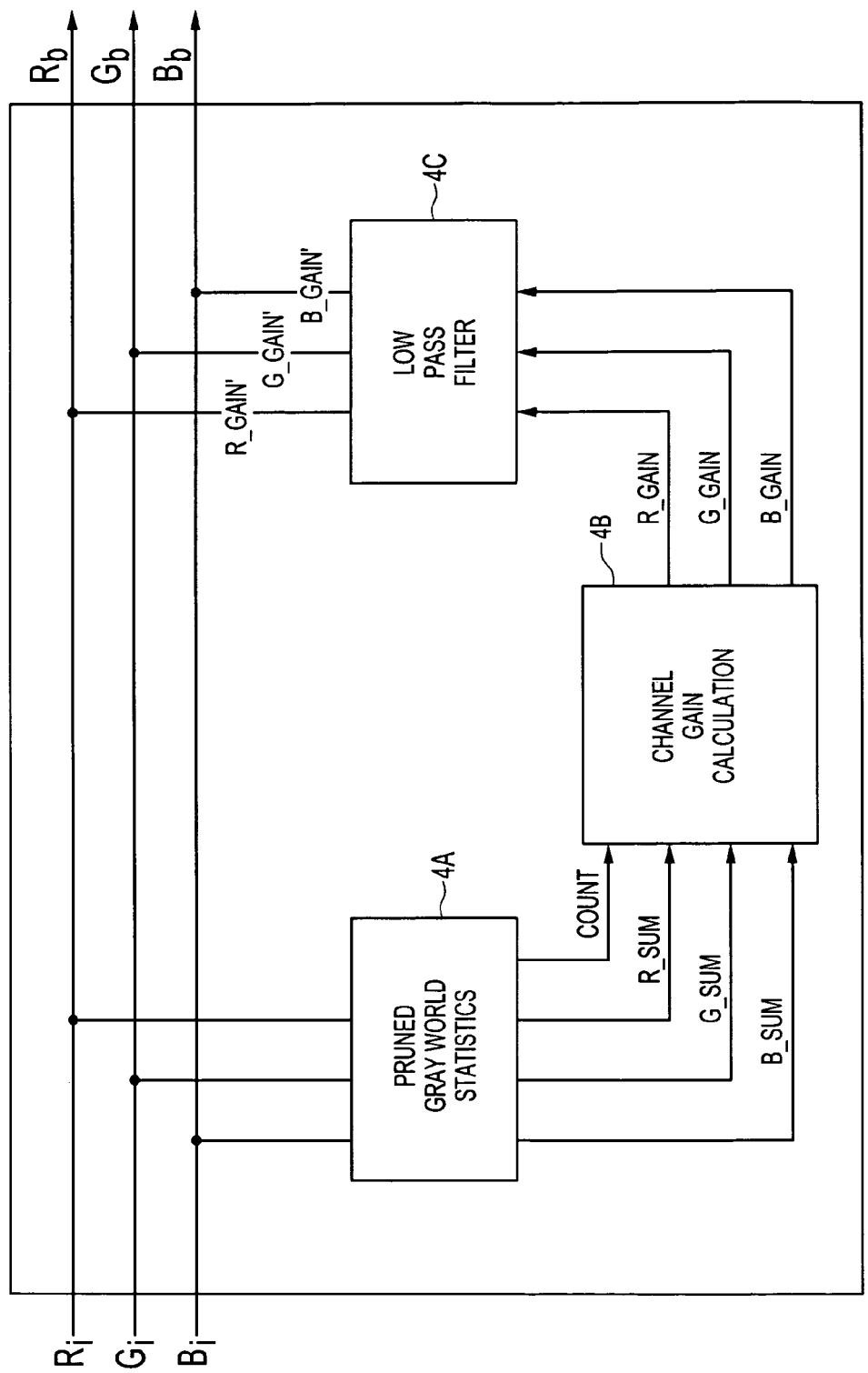
FIG. 2 shows a functional block diagram illustrating portions of the process illustrated in FIG. 1 in greater detail.

The color balance process 4 of FIG. 1 is now explained in more detail with respect to FIG. 2. First, pruned gray world statistics, R_Sum, G_Sum, B_Sum, and Count are calculated in process 4a. Then channel gains R_Gain, G_Gain, and B_Gain are calculated in channel gain calculation process block 4b and applied to input signals Ri, Gi, and Bi to produce color balanced image data, Rb, Gb, and Bb. Processing block 4c is described below.

Referring back to processing block 4a, gray world statistics can be derived by integrating the input image to gray. See "The Reproduction of Colour" by R. W. G. Hunt, 4th Edition 1987 Fountain Press, ISBN 0-86343-088-0, the disclosure of which is incorporated herein by reference. In an embodiment, every pixel of the input image is sampled by processing block 4a for integration to gray. The sums of the chromaticity of the color channels of each pixel (R_SUM, G_SUM, and B_SUM) are calculated in processing block 4a and then used to calculate the chromaticity of the gray world summary in processing block 4b. The chromaticity of the gray world summary is defined as follows, the red value, GW_CR=R_SUM/(R_SUM+G_SUM+B_SUM); the green value, GW_CG=G_SUM/(R_SUM+G_SUM+B_SUM); and the blue value, GW_CB=B_SUM/(R_SUM+G_SUM+B_SUM). In one embodiment, the chromaticity of all three components sums up to one. In other words, GW_CR+GW_CG+GW_CB=1. It should be appreciated that any pixel-selection method may be employed in processing block 4a, including but not limited to random sampling of pixels in the image, or alternatively, any other method or operation that tends to select pixels.

The accuracy of the gray world summary, can be further improved by pruning, i.e., excluding obvious outliers, such as pixels near saturation, to compensate for fully saturated color objects, etc. An embodiment of a pruning process is shown by the flowchart in FIG. 3. The process begins when a pixel is selected (step 10).

Figure 6:
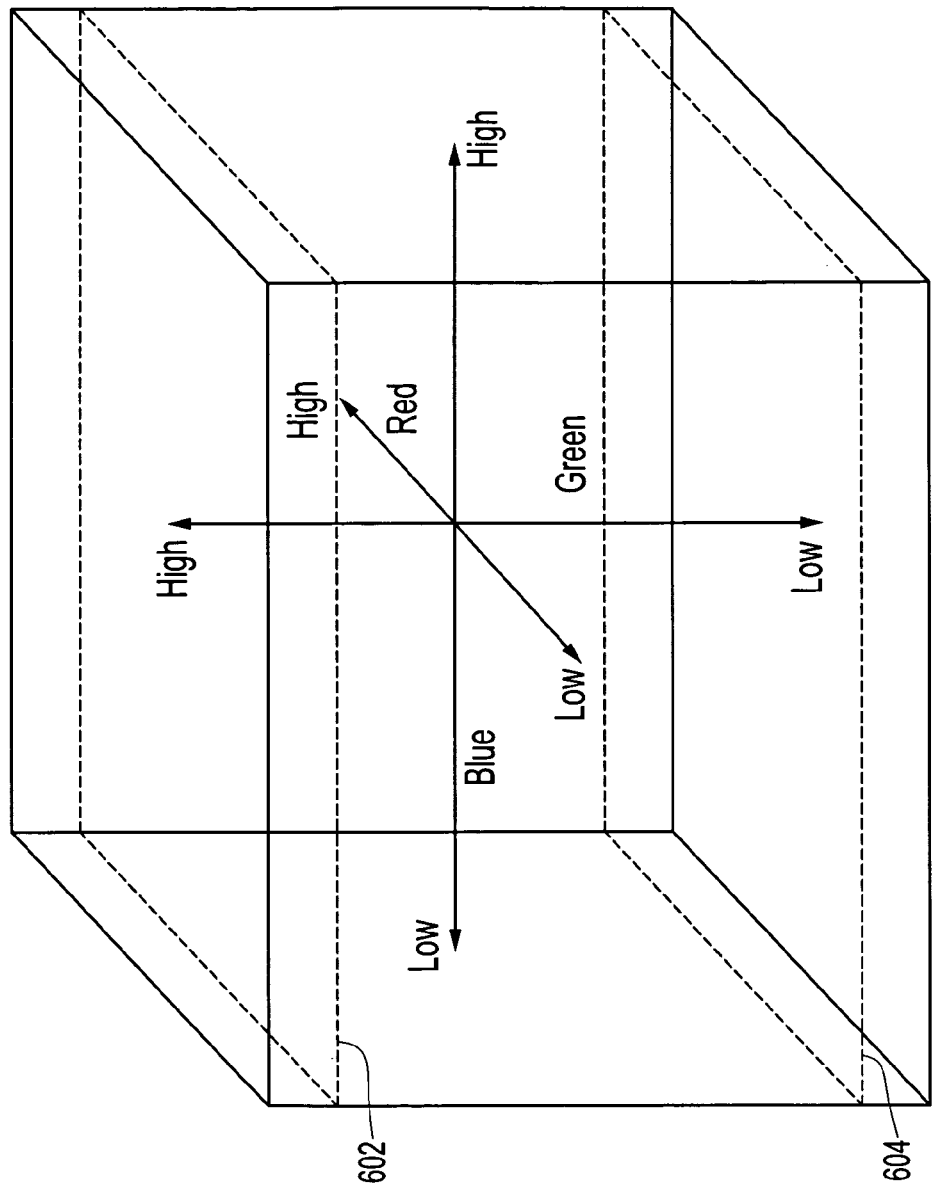
FIG. 6 shows range of values for red, green, and blue color channels plotted three dimensionally.

In an embodiment of the pruning process, a pixel is not included in the gray world statistics, if any one of the color channels is at a value that would skew the gray world statistics. FIG. 6 shows an embodiment in which the color channels are red, green, and blue color channels and the range of values for each color channel are plotted three dimensionally. The range of blue values are shown along the y-axis, the range of green values are shown along the x-axis, and the range of red values are shown along the z-axis. The dashed line 602 shows an upper limit for the green value, above which the green value would skew the gray world statistics. The dashed line 604 shows a lower limit for the green value, below which the green value would skew the gray world statistics. Similarly, upper and lower limits are applied to the blue and red values as well (not shown). Therefore, if any one of the red, green, or blue values are above their respective upper limits or below their respective lower limits, the pixel will not be included in the gray world statistics.

The upper and lower limits may be predetermined independently of each other. Alternatively, the upper and lower limits for some or all of the color channels may be based upon the value of another color channel. In an embodiment, the upper and lower limits of a color channel may be calculated as fractions of the value of another color channel.

In an embodiment, the green value lower limit is a preset low value (LOW_GREEN_VALUE) and the green value upper limit is a preset high value (HIGH_GREEN_VALUE); the red value lower limit is a preset low fraction of the green value (LOW_RED_GREEN_FRACTION) and the red value upper limit is a preset high fraction of the green value (HIGH_RED_GREEN_FRACTION); and the blue value lower limit is a preset low fraction of the green value (LOW_BLUE_GREEN_FRACTION) and the blue value upper limit is a preset high fraction of the green value (HIGH_BLUE_GREEN_FRACTION).

In another embodiment of the pruning process, a pixel is not included in the gray world statistics if any one of the color channels is at a value that would skew the gray world statistics as described above, and is also not included if two of the color channels in the pixel comprise values that would skew the gray world statistics when considered together. The two color channel values may be defined as skewing the gray world statistics when considered together if both of the color channel values are below respective lower limits or if both of the color channel values are above respective upper limits.

Figure 7:
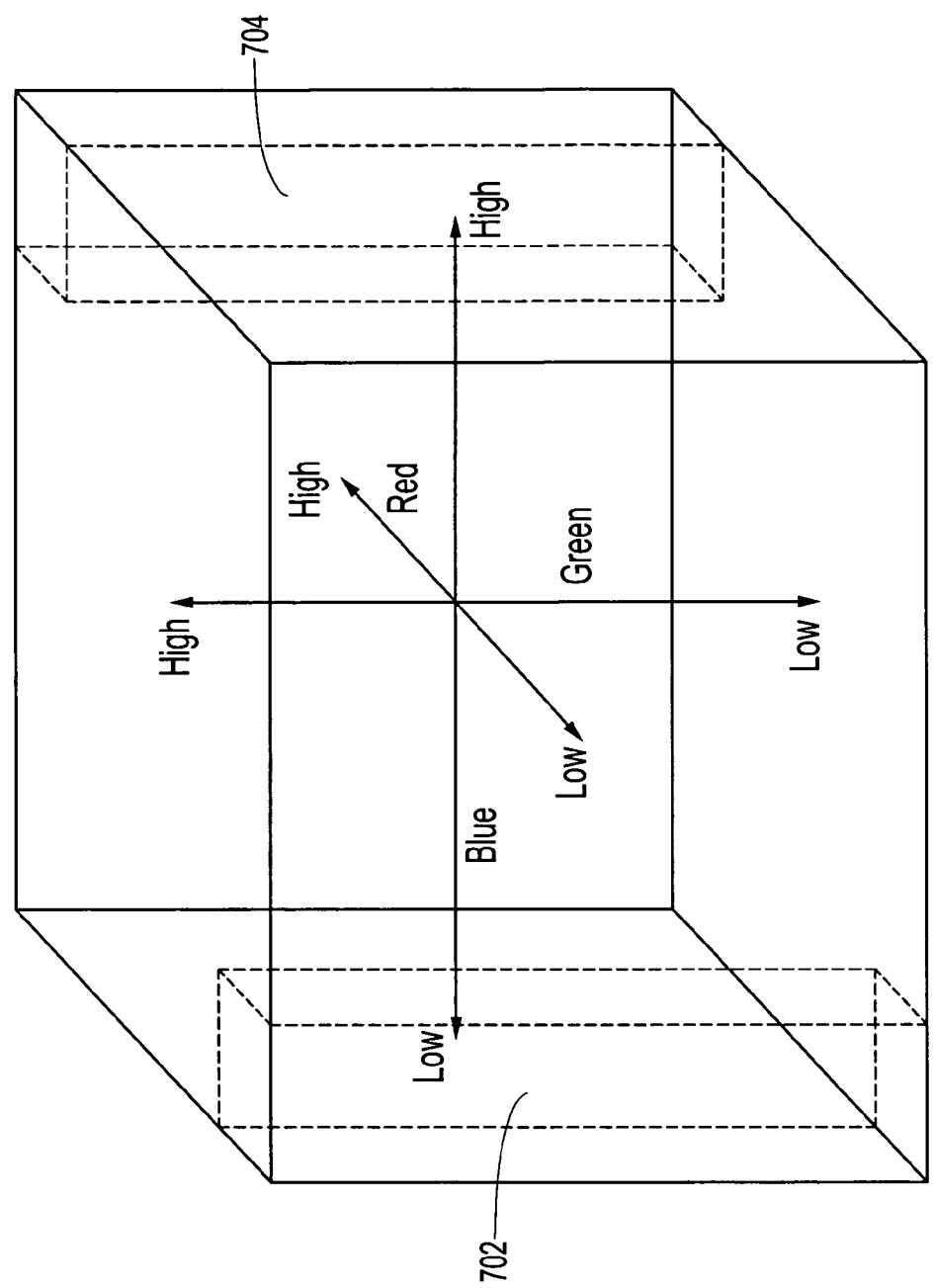
FIG. 7 shows the range of values for red, green, and blue color channels plotted three dimensionally.

FIG. 7 shows an embodiment in which the color channels are red, green, and blue color channels and the range of values for each color channel are plotted three dimensionally. The range of blue values are shown along the y-axis, the range of green values are shown along the x-axis, and the range of red values are shown along the z-axis. The area denoted by a dashed line 702 shows an area in which a vector of the sum of the blue and red values would extend when both the blue and red values individually are below their respective lower limits. The area denoted by a dashed line 704 shows an area in which a vector of the sum of the blue and red values would extend when both the blue and red values individually are above their respective upper limits. A pixel having a vector of the sum of the blue and red values falling within areas 702 or 704 would not be included in the gray world statistics. Similar upper limits and lower limits may be included for the green value considered with the red value and the green value considered with the blue value.

The respective lower limits and respective upper limits, e.g. 702, 704, used to consider the two color channel values together may be different from the respective lower limits and respective upper limits, e.g. 602, 604 for green (FIG. 6), used to consider the color channel values by themselves.

In an embodiment, the pixel is excluded from the gray world statistics if the red value is higher than a derived high fraction of the green value (HIGH_QUARTER_RED_GREEN_FRACTION) and the blue value is also higher than a derived high fraction of the green value (HIGH_QUARTER_BLUE_GREEN_FRACTION). Additionally, the pixel is excluded from the gray world statistics if the red value is lower than a derived low fraction of the green value (LOW_QUARTER_RED_GREEN_FRACTION) and the blue value is also lower than a derived low fraction of the green value (LOW_QUARTER_BLUE_GREEN_FRACTION).

The HIGH_QUARTER_RED_GREEN_FRACTION value is derived as follows:

$$\text{HIGH\_QUARTER\_RED\_GREEN\_FRACTION} = \text{HIGH\_RED\_GREEN\_FRACTION} - ((\text{HIGH\_RED\_GREEN\_FRACTION} - \text{LOW\_RED\_GREEN\_FRACTION}) * \tfrac{1}{4}) \quad (1)$$

The LOW_QUARTER_RED_GREEN_FRACTION value is derived as follows:

$$\text{LOW\_QUARTER\_RED\_GREEN\_FRACTION} = \text{LOW\_RED\_GREEN\_FRACTION} + ((\text{HIGH\_RED\_GREEN\_FRACTION} - \text{LOW\_RED\_GREEN\_FRACTION}) * \tfrac{1}{4}) \quad (2)$$

The HIGH_QUARTER_BLUE_GREEN_FRACTION value is derived as follows:

HIGH_QUARTER_BLUE_GREEN_FRACTION=
 HIGH_BLUE_GREEN_FRACTION−
 ((HIGH_BLUE_GREEN_FRACTION−
 LOW_BLUE_GREEN_FRACTION)*¼)   (3)

The LOW_QUARTER_BLUE_GREEN_FRACTION value is derived as follows:

LOW_QUARTER_BLUE_GREEN_FRACTION=
 LOW_BLUE_GREEN_FRACTION+
 ((HIGH_BLUE_GREEN_FRACTION−
 LOW_BLUE_GREEN_FRACTION)*¼)   (4)

Figure 3:
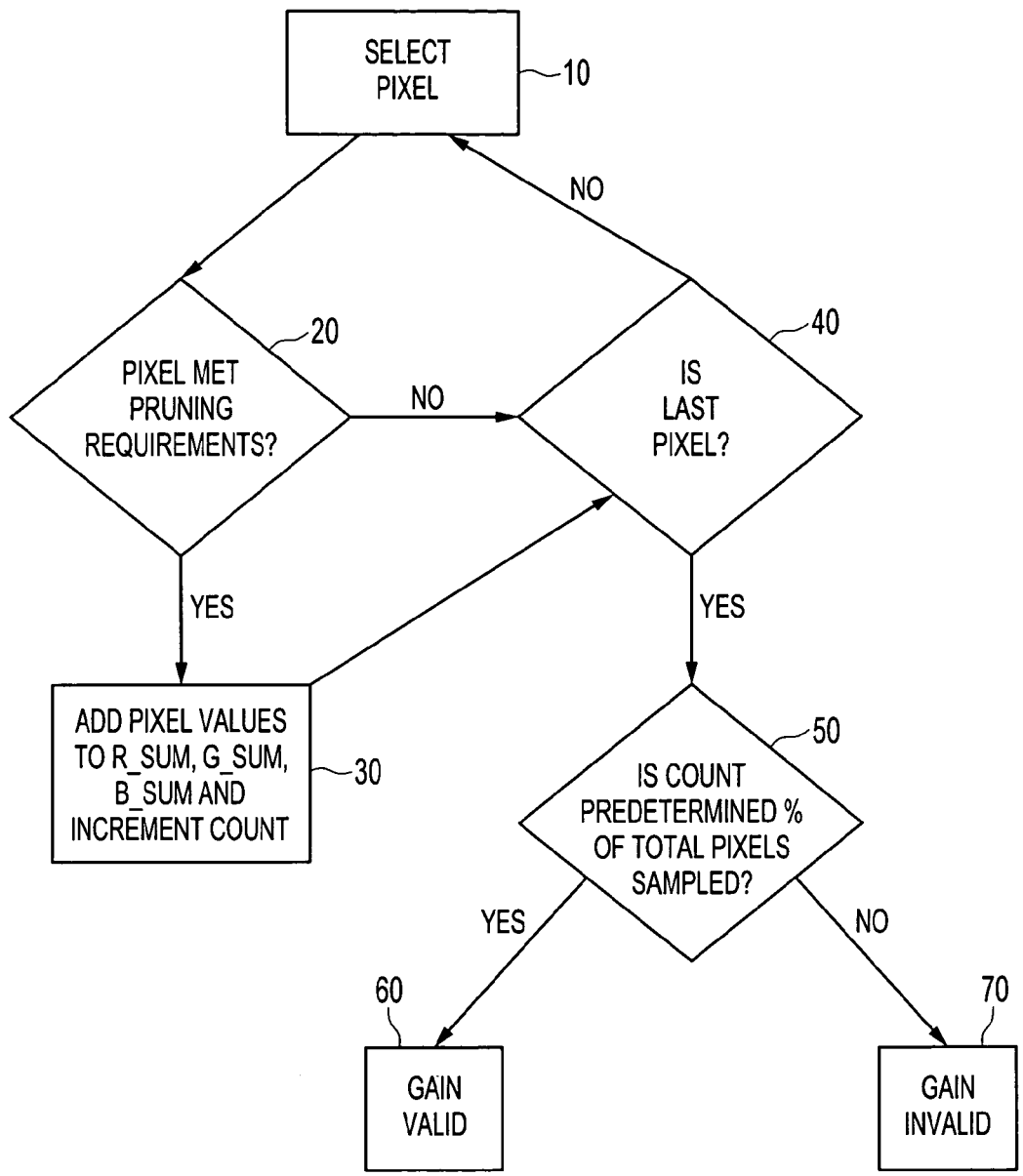
FIG. 3 shows a flowchart illustrating portions of the process illustrated in FIG. 2 in greater detail.

These pruning process tests are performed in step 20 of FIG. 3.

If the pixel passes the criteria listed above (step 20), the red, green, and blue values of the pixel are added to the grand total of each component respectively, R_SUM, G_SUM, and B_SUM, and a valid pixel count, COUNT, is incremented (step 30). If the selected pixel is not the last pixel for sampling (step 40), the next pixel is selected (step 10), and the pruning criteria determination is performed again (step 20). The same operational steps, as described above with reference to FIG. 3, are performed until it is determined that the last pixel to be included in the gray world statistics has been selected (step 40). If at step 20, it is determined that the pixel does not meet the pruning criteria, step 40 is executed as described above.

Once it is determined that a selected pixel is the last pixel from an image for sampling (yes at step 40), the color balance system determines at step 50 if COUNT is a predetermined percentage of the total number of image pixels sampled, for example, equal to or greater than a quarter of the total pixels sampled. If COUNT is equal to or greater than the predetermined percentage of the total number of image pixels sampled, then the color channel gains are deemed valid (step 60) and should be calculated in process block 4b and applied to the image data, Ri, Gi, and Bi. Otherwise, the gain is deemed invalid and the color channels remain unchanged (step 70). It should be noted that step 50, i.e., determining if COUNT is a predetermined percentage of the total pixels sampled, can occur after channel gain is calculated, although it is more efficient to make the determination before channel gain is calculated.

The calculation of the channel gain in processing block 4b (FIG. 2) revolves around balancing the chromaticity of the gray world summary against the chromaticity of a predetermined neutral white point. Chromaticity is defined in a concept similar to the known CIE XYZ standard observer tristimulus colorimetric system. See "Color Science Concepts and Methods, Quantitative Data and Formulae" by Wyszecki and Stiles, Wiley, ISBN 0-471-39918-3, the disclosure of which is incorporated herein by reference. The image sensor's spectral response is usually not the same as the CIE standard observer. The neutral white point of the sensor needs to be calibrated against known light sources because color balance is dependant on scene illuminant.

The chromaticity of the neutral white point is determined in processing block 4b. The determination can be automatically calculated as a spectral response of the image sensor, preset based on the user's preference, or a combination of the two. It should be appreciated that any method for selecting a neutral white point may be used. The chromaticity of the neutral white point is comprised of three components, the red value, N_CR, the green value, N_CG, and the blue value, N_CB. In a preferred embodiment, the chromaticity of all three components sums up to one. In other words, N_CR+N_CG+N_CB=1.

In an embodiment, a system tuning parameter, G_BIAS, may be used in processing block 4b to fine tune the rendered image with respect to the color channel sensitivity of the image sensor. G_BIAS can be automatically calculated with respect to the color channel sensitivity of the image sensor, preset based on the user's preference, or a combination of the two. It should be appreciated that any method for selecting a system tuning parameter may be used.

In an embodiment, green channel gain, G_GAIN, is calculated as a function of the chromaticity of a neutral white point (N_CR, N_CG, N_CB), the chromaticity of the gray world summary (GW_CR, GW_CG, GW_CB), and an optional system tuning parameter (G_BIAS). Rather than independently calculating the red channel gain, the red channel gain is calculated as a function of the green channel gain. Finally, the blue channel gain is calculated as a function of the red and green channel gains. In one embodiment, the above mentioned parameters are used to calculate the gain for each color channel in processing block 4b as follows:

$$G\_GAIN = \frac{GW\_CR + GW\_CB + G\_BIAS}{N\_CR + N\_CB + G\_BIAS} \quad (5)$$

$$R\_GAIN = \frac{\frac{GW\_CG}{G\_GAIN} + GW\_CB}{N\_CG + N\_CB} \quad (6)$$

$$B\_GAIN = \frac{\frac{GW\_CR}{R\_GAIN} + \frac{GW\_CG}{G\_GAIN}}{N\_CR + N\_CG} \quad (7)$$

In an embodiment, recursive calculations of the channel gains are performed in processing block 4b, allowing for more complete normalization of the channel gains. The recursive calculation consists of the calculations of Equations (5), (6), and (7) and the following recursive calculations, which can be repeated as many times as desired:

$$G\_GAIN' = \frac{(GW\_CR * R\_GAIN) + (GW\_CB * B\_GAIN) + G\_BIAS}{N\_CR + N\_CB + G\_BIAS} \quad (8)$$

$$R\_GAIN' = \frac{\frac{GW\_CG}{G\_GAIN} + \frac{GW\_CB}{B\_GAIN}}{N\_CG + N\_CB} \quad (9)$$

$$B\_GAIN' = \frac{\frac{GW\_CR}{R\_GAIN} + \frac{GW\_CG}{G\_GAIN}}{N\_CR + N\_CB} \quad (10)$$

In another embodiment, the channel gains calculated in either Equations (5), (6), and (7) or Equations (8), (9), and (10), now represented as R_GAIN, G_GAIN, B_GAIN for simplicity, are normalized in processing block 4b to minimize the variation of the luminance signal while maintaining the ratio between the color channel gains. Since the green channel constitutes the majority of the luminance signal, the variation of the luminance signal is minimized by setting the green channel gain to 1.0 and the red channel gain and the blue channel gain are recalculated while maintaining the ratio between the red, green, and blue channel gains. This is accomplished by:

$$G\_GAIN' = 1.0 \tag{11}$$

$$R\_GAIN' = \frac{R\_GAIN}{G\_GAIN} \tag{12}$$

$$B\_GAIN' = \frac{B\_GAIN}{G\_GAIN} \tag{13}$$

In another embodiment, the red, green, and blue channel gains calculated in processing block 4b and described above are used to respectively adjust the signals Ri, Gi, and Bi in processing block 4 to produce signals Rb, Gb, and Bb. For single picture snapshot applications, the derived channel gains can be applied for the subsequent color processing stages. For video applications, where video data flow needs to be continuous, the new channel gains for each frame can be stored in processing block 4c and can be applied for the next frame. If a smoother transition is desired, a low pass filtering of the channel gains can be implemented by storing multiple past channel gains and performing a low pass filtering of the past and current channel gains. The low pass filtering can be implemented by a running mean or moving average filter, as shown in processing block 4c. It should be appreciated that any known low pass filtering method may be used.

As is apparent from the above description, the various embodiments achieve significant color balance, are straightforward, and are relatively easy to implement. As a result, color balance is achieved in a simple and efficient manner.

Figure 4:
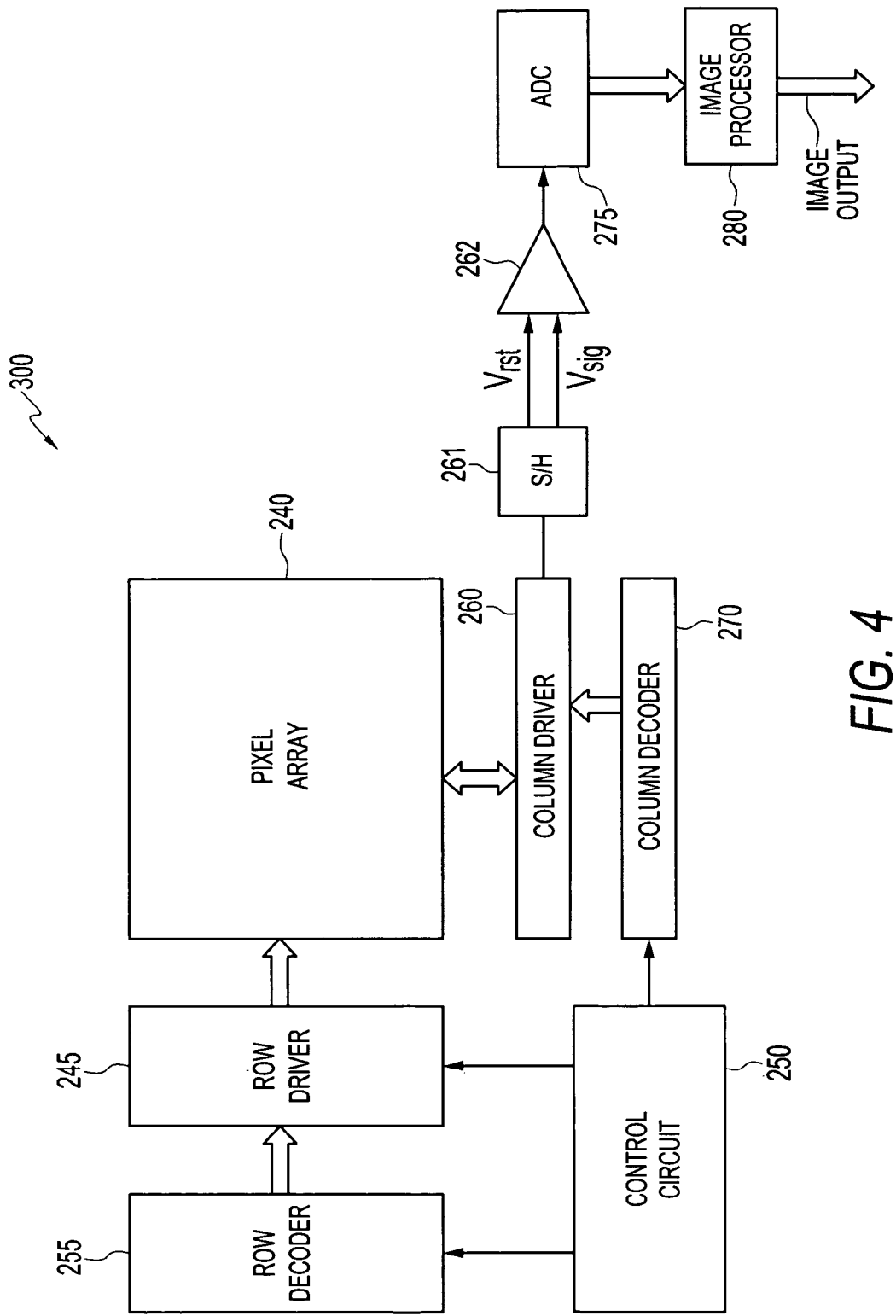
FIG. 4 shows a block diagram of an imager constructed in accordance with an embodiment.

FIG. 4 illustrates an imaging device 300 having a pixel array 240 suitable for providing the processing illustrated in block 2 of FIG. 1. The FIG. 4 imaging device 300 employs a Bayer filter and produces R, G, B, pixel output signals. Row lines of the array 240 are selectively activated by a row driver 245 in response to row address decoder 255. A column driver 260 and column address decoder 270 are also included in the imaging device 300. The imaging device 300 is operated by the timing and control circuit 250, which controls the address decoders 255, 270. The control circuit 250 also controls the row and column driver circuitry 245, 260.

A sample and hold circuit 261 associated with the column driver 260 reads a pixel reset signal Vrst and a pixel image signal Vsig for selected pixels of the array 240. A differential signal (Vrst-Vsig) is produced by differential amplifier 262 for each pixel and is digitized by analog-to-digital converter 275 (ADC). The analog-to-digital converter 275 supplies the digitized pixel signals to an image processor 280 which forms and may output a digital image. The image processor 280 has a circuit (e.g., processor) that is capable of performing the color balance processing (FIG. 1, block 4) disclosed in the embodiments on pixel array 240.

Alternatively, the color balance processing can be done on the analog output of the pixel array by a hardwired or logic circuit (not shown) located between the amplifier 262 and ADC 275 or on the digital image output of the image processor 280, in software or hardware, by another device.

Figure 5:
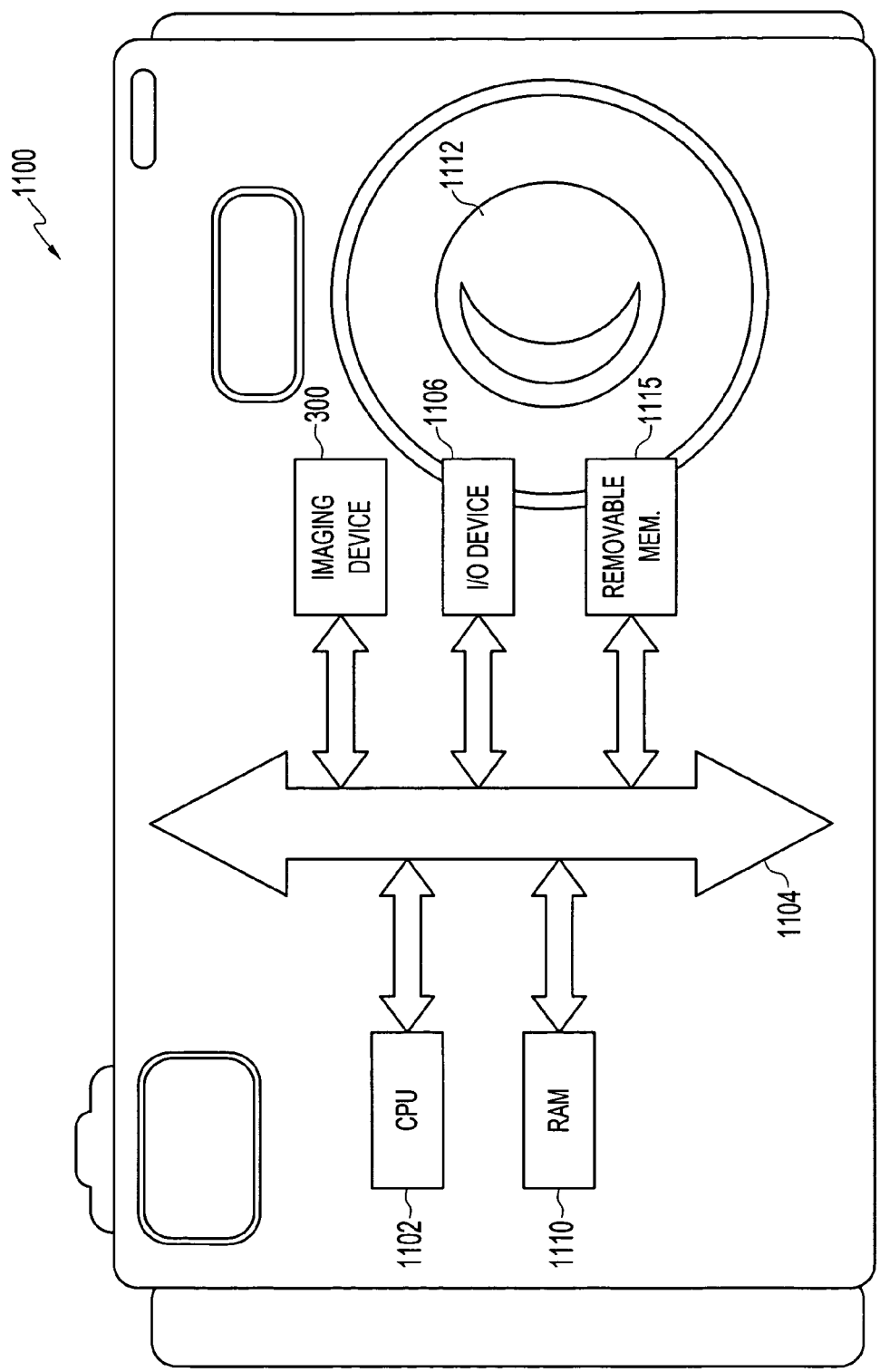
FIG. 5 shows a processor system incorporating at least one imaging device including circuitry for computing color balance constructed in accordance with an embodiment.

FIG. 5 shows system 1100, a typical processor system modified to include the imaging device 300 (FIG. 4) incorporating the color balance methods according to the embodiments. The system 1100 is a system having digital circuits that could include image sensor devices. Without being limiting, such a system could include a computer system, still or video camera system, scanner, machine vision, video phone, and auto focus system, or other imager systems.

System 1100, for example a video or digital still camera system, includes a lens 1112 to focus an image on a pixel array 240 (FIG. 4). The system 1100 also generally comprises a central processing unit (CPU) 1102, such as a microprocessor used to control camera operations, that communicates with one or more input/output (I/O) devices 1106 over a bus 1104. Imaging device 300 also communicates with the CPU 1102 over the bus 1104. The system 1100 also includes random access memory (RAM) 1110, and can include removable memory 1115, such as flash memory, which also communicate with the CPU 1102 over the bus 1104. The imaging device 300 may be combined with a processor, such as a CPU, digital signal processor, or microprocessor, with or without memory storage on a single integrated circuit or on a different chip than the processor.

While various embodiments have been described and illustrated above, it should be understood that these embodiments are not to be considered as limiting. For example, although an embodiment has been described in connection with a CMOS image sensor, other embodiments are applicable to other electronic image sensors, such as CCD image sensors, for example. It should be appreciated that additions, deletions, substitutions, and other modifications can be made. Accordingly, the disclosure is not to be considered as limited by the foregoing description but is only limited by the appended claims.

What is claimed as new and desired to be protected by Letters Patent of the United States is:

1. A method of performing a color balancing operation, the method comprising:
   using a processing circuit to perform the acts of:
      calculating gray world statistics for input image pixel data having values of a plurality of color channels; and
      using said grey world statistics in a color balancing operation,
      wherein calculating said gray world statistics comprises comparing the values of the plurality of color channels in a pixel to a respective first criteria and excluding the pixel from the gray world statistics if any one of the plurality of color channels in the pixel comprises a value which exceeds the respective first criteria for inclusion,
      wherein calculating said gray world statistics further comprises comparing the values of the plurality of color channels in a pixel to a respective second criteria and excluding the pixel from the gray world statistics if two of the color channels in the pixel comprise values that both exceed the respective second criteria for inclusion, and
      wherein calculating said gray world statistics further comprises not excluding the pixel from the gray world statistics if fewer than two of the color channels in the pixel comprise respective values that exceed the respective second criteria for inclusion and if none of the plurality of color channels in the pixel comprise a respective value which exceeds the respective first criteria for inclusion,
      wherein the respective first criteria are different than the respective second criteria.

2. The method of claim 1,
   wherein a value of a respective color channel is defined as exceeding a respective first criteria for inclusion if the value is above a respective first upper limit or below a respective first lower limit, and
   wherein two of the color channels are defined as comprising values that both exceed the respective second criteria for inclusion if the respective values of both of the two color channels are below respective second lower limits or if the respective values of both of the two color channels are above respective second upper limits.

3. A method of performing a color balancing operation, the method comprising:
using a processing circuit to perform the acts of:
calculating gray world statistics for input image pixel data having values of a plurality of color channels; and
using said grey world statistics in a color balancing operation,
wherein calculating said gray world statistics comprises comparing the values of the plurality of color channels in a pixel to a first criteria and excluding the pixel from the gray world statistics if any one of the plurality of color channels in the pixel comprises a value which exceeds the first criteria for inclusion by itself,
wherein calculating said gray world statistics further comprises comparing the values of the plurality of color channels in a pixel to a second criteria and excluding the pixel from the gray world statistics if two of the color channels in the pixel comprise values that both exceed the second criteria for inclusion when considered together,
wherein a color channel value is defined as exceeding a criteria for inclusion by itself if the color channel value is above a respective upper limit or below a respective lower limit,
wherein two of the color channel values are defined as exceeding a criteria for inclusion when considered together if both of the two color channel values are below respective lower limits or if both of the two color channel values are above respective upper limits,
wherein the respective upper limit and the respective lower limit for a first color channel by itself are predetermined, and
wherein the respective upper limits and respective lower limits for the other color channels by themselves and the respective upper limits and respective lower limits for two of the color channel values considered together are based on the first color channel value.

4. The method of claim 3,
wherein the respective upper limits and respective lower limits for the other color channels by themselves and the respective upper limits and respective lower limits for two of the color channel values considered together are fractions of the first color channel value.

5. A method of performing a color balancing operation, the method comprising:
using a processing circuit to perform the acts of:
calculating gray world statistics for input image pixel data having values of a plurality of color channels; and
using said grey world statistics in a color balancing operation,
wherein calculating said gray world statistics comprises comparing the values of the plurality of color channels in a pixel to a first criteria and excluding the pixel from the gray world statistics if any one of the plurality of color channels in the pixel comprises a value which exceeds the first criteria for inclusion by itself,
wherein calculating said gray world statistics further comprises comparing the values of the plurality of color channels in a pixel to a second criteria and excluding the pixel from the gray world statistics if two of the color channels in the pixel comprise values that both exceed the second criteria for inclusion when considered together,
wherein the color channels comprise red, green, and blue color channels,
wherein the green color channel value exceeds a criteria for inclusion by itself if the green color channel value is lower than a first preset value or higher than a second preset value,
wherein the red color channel value exceeds a criteria for inclusion by itself if the red color channel value is lower than a first fraction of the green color channel value or higher than a second fraction of the green color channel value,
wherein the blue color channel value exceeds a criteria for inclusion by itself if the blue color channel value is lower than a third fraction of the green color channel value or higher than a fourth fraction of the green color channel value,
wherein the red color channel value and the blue color channel value are defined as exceeding a criteria for inclusion when considered together if the red color channel value is higher than a fifth fraction of the green color channel value and the blue color channel value is higher than a seventh fraction of the green color channel value, and
wherein the red color channel value and the blue color channel value are defined as exceeding a criteria for inclusion when considered together if the red color channel value is lower than a sixth fraction of the green color channel value and the blue color channel value is lower than an eighth fraction of the green color channel value.

6. The method of claim 5,
wherein the fifth fraction of the green color channel value is calculated according to:

fifth fraction of the green color channel value=second fraction of the green color channel value−((second fraction of the green color channel value−first fraction of the green color channel value)*¼), wherein the sixth fraction of the green color channel value is calculated according to:

sixth fraction of the green color channel value=first fraction of the green color channel value+((second fraction of the green color channel value−first fraction of the green color channel value)*¼), wherein the seventh fraction of the green color channel value is calculated according to:

seventh fraction of the green color channel value=fourth fraction of the green color channel value−((fourth fraction of the green color channel value−third fraction of the green color channel value)*¼), and wherein the eighth fraction of the green color channel value is calculated according to:

eighth fraction of the green color channel value=third fraction of the green color channel value+((fourth fraction of the green color channel value−third fraction of the green color channel value)*¼).

7. The method of claim 1, wherein calculating grey world statistics further comprises determining if a total number of pixels selected for inclusion is equal to or greater than a predetermined percentage of the total number of pixels considered in the calculation of the gray world statistics.

8. The method of claim 1, further comprising:
  calculating color channel gains for the input image pixel data based on the gray world statistics and a neutral white point; and
  transforming the input image pixel data to an output image by applying the color channel gains to respective color channels of the input image.

9. The method of claim 1, wherein the color channels comprise cyan, magenta, yellow, and black color channels.

10. A method of performing color balancing, comprising: using a processing circuit to perform the acts of:
  calculating gray world statistics from input image pixel data;
  pruning pixel data from being included in the grey world statistics by eliminating pixels which have an individual color channel value which exceeds a respective first upper threshold or a respective first lower threshold for the individual color channel value, and by eliminating pixels which have groups of color channel values in which two or more members of the group exceed respective second upper thresholds for the color channel value or two or more members of the group exceed respective second lower thresholds for the color channel value;
  including in the grey world statistics pixels which do not have an individual color channel value which exceeds a respective first upper threshold or a respective first lower threshold for the individual color channel value, and which have groups of color channel values in which only one of the members of the group exceed respective second upper thresholds for the color channel value and in which only one of the members of the group exceed respective second lower thresholds for the color channel value, and
  using said grey world statistics to color balance an image,
  wherein the respective first upper threshold for the individual color channel values are different than the respective second upper threshold for individual color channel values, and
  wherein the respective first lower threshold for the individual color channel values are different than the respective second lower threshold for individual color channel values.

11. The method of claim 10, wherein the upper and lower threshold for a first individual color channel value is predetermined.

12. The method of claim 11, wherein the upper and lower threshold for all other individual color channel values are fractions of the first individual color channel value.

13. The method of claim 11, wherein the upper and lower threshold for the color channel values when considered as a group are fractions of the first individual color channel value.

14. A method of performing color balancing, comprising: using a processing circuit to perform the acts of:
  calculating gray world statistics from input image pixel data
  pruning pixel data from being including in the grey world statistics by eliminating pixels which have an individual color channel value which exceeds an upper threshold or a lower threshold for the individual color channel value, and by eliminating pixels which have groups of color channel values in which all members of the group exceed respective upper thresholds for the color channel value when considered as a group or all members of the group exceed respective lower thresholds for the color channel value when considered as a group; and
  using said grey world statistics to color balance an image,
  wherein the upper and lower threshold for a first individual color channel value is predetermined,
  wherein a lower threshold of a second individual color channel value is a first fraction of the first individual color channel value and an upper threshold of the second individual color channel value is a second fraction of the first individual color channel value,
  wherein a lower threshold of a third individual color channel value is a third fraction of the first individual color channel value and an upper threshold of the third individual color channel value is a fourth fraction of the first individual color channel value,
  wherein an upper threshold for the second individual color channel value when considered with the third individual color channel value is a fifth fraction of the first individual color channel value and an upper threshold for the third individual color channel value when considered with the second individual color channel value is a seventh fraction of the first individual color channel value, and
  wherein a lower threshold for the second individual color channel value when considered with the third individual color channel value is a sixth fraction of the first individual color channel value and a lower threshold for the third individual color channel value when considered with the second individual color channel value is an eighth fraction of the first individual color channel value.

15. The method of claim 14, wherein the fifth fraction of the first individual color channel value is calculated according to:

$$\text{fifth fraction of the first individual color channel value} = \text{second fraction of the first individual color channel value} - ((\text{second fraction of the first individual color channel value} - \text{first fraction of the first individual color channel value}) * \tfrac{1}{4}),$$

wherein the sixth fraction of the first individual color channel value is calculated according to:

$$\text{sixth fraction of the first individual color channel value} = \text{first fraction of the first individual color channel value} + ((\text{second fraction of the first individual color channel value} - \text{first fraction of the first individual color channel value}) * \tfrac{1}{4}),$$

wherein the seventh fraction of the first individual color channel value is calculated according to:

$$\text{seventh fraction of the first individual color channel value} = \text{fourth fraction of the first individual color channel value} - ((\text{fourth fraction of the first individual color channel value} - \text{third fraction of the first individual color channel value}) * \tfrac{1}{4}), \text{ and}$$

wherein the eighth fraction of the first individual color channel value is calculated according to:

$$\text{eighth fraction of the first individual color channel value} = \text{third fraction of the first individual color channel value} + ((\text{fourth fraction of the first individual color channel value} - \text{third fraction of the first individual color channel value}) * \tfrac{1}{4}).$$

16. An imaging device, comprising:
  a pixel array for providing pixel signals representing a captured image;
  a processing circuit that provides input image pixel data having a plurality of color channels for each image pixel from the pixel signals; and a circuit that calculates gray world statistics for the input image pixel data and uses the gray world statistics to perform a color balancing operation, wherein the circuit excludes a pixel from the gray world statistics if any one of the plurality of color channels in the pixel comprises a value which exceeds a respective first criteria for inclusion, and wherein the circuit excludes the pixel from the gray world statistics if two of the color channels in the pixel comprise values which both exceed respective second criteria for inclusion when considered together, wherein the circuit does not exclude a pixel from the gray world statistics if none of the plurality of color channels in the pixel comprises a value which exceeds the respective first criteria for inclusion and if fewer than two of the color channels in the pixel comprise values which exceed the respective second criteria for inclusion when considered together, wherein the respective first criteria are different than the respective second criteria.

17. The device of claim 16, wherein a value of a color channel is defined as exceeding the respective first criteria for inclusion if the color channel value is above a respective first upper limit or below a respective first lower limit, and wherein the respective values of two of the color channels values are defined as exceeding a respective second criteria for inclusion when considered together if both of the two color channel values are below respective second lower limits or if both of the two color channel values are above respective second upper limits.

18. An imaging device, comprising:

a pixel array for providing pixel signals representing a captured image;

a processing circuit that provides input image pixel data having a plurality of color channels for each image pixel from the pixel signals; and a circuit that calculates gray world statistics for the input image pixel data and uses the gray world statistics to perform a color balancing operation, wherein the circuit excludes a pixel from the gray world statistics if any one of the plurality of color channels in a pixel comprises a value which exceeds a criteria for inclusion by itself, wherein the circuit excludes the pixel from the gray world statistics if two of the color channels in the pixel comprise values which both exceed a criteria for inclusion when considered together, wherein a color channel value is defined as exceeding a criteria for inclusion by itself if the color channel value is above a respective upper limit or below a respective lower limit, wherein two of the color channel values are defined as exceeding a criteria for inclusion when considered together if both of the two color channel values are below respective lower limits or if both of the two color channel values are above respective upper limits, wherein the respective upper limit and the respective lower limit for a first color channel by itself are predetermined, and wherein the respective upper limits and respective lower limits for the other color channels by themselves and the respective upper limits and respective lower limits for two of the color channel values considered together are based on the first color channel value.

19. The device of claim 18, wherein the respective upper limits and respective lower limits for the other color channels by themselves and the respective upper limits and respective lower limits for two of the color channel values considered together are fractions of the first color channel value.

20. An imaging device, comprising:

a pixel array for providing pixel signals representing a captured image;

a processing circuit that provides input image pixel data having a plurality of color channels for each image pixel from the pixel signals; and a circuit that calculates gray world statistics for the input image pixel data and uses the gray world statistics to perform a color balancing operation, wherein the circuit excludes a pixel from the gray world statistics if any one of the plurality of color channels in a pixel comprises a value which exceeds a criteria for inclusion by itself, wherein the circuit excludes the pixel from the gray world statistics if two of the color channels in the pixel comprise values which both exceed a criteria for inclusion when considered together, wherein the color channels comprise red, green, and blue color channels, wherein the green color channel value is defined as skewing the gray world statistics if the green color channel value is lower than a first preset value or higher than a second preset value, wherein the red color channel value is defined as skewing the gray world statistics if the red color channel value is lower than a first fraction of the green color channel value or higher than a second fraction of the green color channel value, wherein the blue color channel value is defined as skewing the gray world statistics if the blue color channel value is lower than a third fraction of the green color channel value or higher than a fourth fraction of the green color channel value, wherein the red color channel value and the blue color channel value are defined as skewing the gray world statistics when considered together if the red color channel value is higher than a fifth fraction of the green color channel value and the blue color channel value is higher than a seventh fraction of the green color channel value, and wherein the red color channel value and the blue color channel value are defined as skewing the gray world statistics when considered together if the red color channel value is lower than a sixth fraction of the green color channel value and the blue color channel value is lower than an eighth fraction of the green color channel value.

21. The device of claim 20, wherein the fifth fraction of the green color channel value is calculated according to:

fifth fraction of the green color channel value=second fraction of the green color channel value−((second fraction of the green color channel value−first fraction of the green color channel value)*¼), wherein the sixth fraction of the green color channel value is calculated according to:

sixth fraction of the green color channel value=first fraction of the green color channel value+((second fraction of the green color channel value−first fraction of the green color channel value)*¼), wherein the seventh fraction of the green color channel value is calculated according to:

seventh fraction of the green color channel value=fourth fraction of the green color channel value−((fourth fraction of the green color channel value third fraction of the green color channel value)*¼), and wherein the eighth fraction of the green color channel value is calculated according to:

eighth fraction of the green color channel value=third fraction of the green color channel value+((fourth fraction of the green color channel value−third fraction of the green color channel value)*¼).

22. The device of claim 16, wherein the circuit determines if a total number of pixels selected for inclusion is a equal to or greater than a predetermined percentage of the total number of pixels considered in the calculation of the gray world statistics.

23. The device of claim 16, wherein the circuit calculates color channel gains for the input image pixel data based on the gray world statistics and a neutral white point and transforms the input image pixel data to an output image by applying the color channel gains to respective color channels of the input image pixel data.

24. An image processing unit, comprising:
means for calculating gray world statistics for input image pixel data having red, green, and blue color channels and for selecting pixels for inclusion in the gray world statistics if a green value is higher than a first preset value and lower than a second preset value, and if a red value is higher than a first fraction of the green value and lower than a second fraction of the green value, and if a blue value is higher than a third fraction of the green value and lower than a fourth fraction of the green value,
wherein the means for calculating gray world statistics does not select pixels for inclusion in the gray world statistics if the red value is higher than a fifth fraction of the green value and the blue value is higher than a seventh fraction of the green value, and
wherein the means for calculating gray world statistics does not select pixels for inclusion in the gray world statistics if the red value is lower than a sixth fraction of the green value and the blue value is lower than an eighth fraction of the green value.

25. A digital camera, comprising:
a lens;
a pixel array for sensing an image through said lens and providing pixel signals representing said image;
an image processing pipeline that provides input image pixel data having a plurality of color channels from said pixel signals, for calculating gray world statistics for the input image pixel data and for using the gray world statistics to perform a color balancing operation,
wherein the image processing pipeline excludes a pixel from the gray world statistics if any one of the plurality of color channels in the pixel comprises a value that is above a respective first upper limit or below a respective first lower limit, and
wherein the image processing pipeline excludes the pixel from the gray world statistics if two of the color channels in the pixel comprise values that are both below respective second lower limits or both above respective second upper limits, and
wherein the image processing pipeline does not exclude a pixel from the gray world statistics if none of the plurality of color channels in the pixel comprise a value that is above a respective first upper limit or below a respective first lower limit and if fewer than two of the color channels in the pixel comprise values that are both below respective second lower limits or both above respective second upper limits, and
wherein the respective first upper limits are different than the respective second upper limits, and
wherein the respective first lower limits are different than the respective second lower limits.

26. The method of claim 10, further comprising using said grey world statistics in a color balancing operation.

27. The method of claim 14, further comprising using said grey world statistics in a color balancing operation.

28. The method of claim 10, further comprising including in the grey world statistics pixels which do not have an individual color channel value which exceeds a respective first upper threshold or a respective first lower threshold for the individual color channel value, and which have groups of color channel values in which none of the members of the group exceed respective second upper thresholds for the color channel value and in which none of the members of the group exceed respective second lower thresholds for the color channel value.

* * * * *

UNITED STATES PATENT AND TRADEMARK OFFICE
CERTIFICATE OF CORRECTION

PATENT NO. : 8,401,288 B2
APPLICATION NO. : 11/513247
DATED : March 19, 2013
INVENTOR(S) : Shane C. Hu It is certified that error appears in the above-identified patent and that said Letters Patent is hereby corrected as shown below:

In the Claims:

In column 11, line 58, in Claim 14, delete "data" and insert -- data; --, therefor.

In column 15, line 7, in Claim 21, delete "value third" and insert -- value-third --, therefor.

In column 15, line 16, in Claim 22, delete "is a" and insert -- is --, therefor.

In column 16, line 8, in Claim 25, delete "data" and insert -- data, --, therefor.

Signed and Sealed this
Second Day of July, 2013

Teresa Stanek Rea
*Acting Director of the United States Patent and Trademark Office*